United States Patent [19]

Larsson

[11] 4,038,849
[45] Aug. 2, 1977

[54] HIGH PRESSURE PRESS

[75] Inventor: Hans Gunnar Larsson, Vasteras, Sweden

[73] Assignee: Asea Aktiebolag, Vasteras, Sweden

[21] Appl. No.: 636,577

[22] Filed: Dec. 1, 1975

[30] Foreign Application Priority Data

Dec. 6, 1974 Sweden .............................. 7415293

[51] Int. Cl.² ........................................... B21D 22/10
[52] U.S. Cl. ........................................ 72/60; 72/272; 72/DIG. 31
[58] Field of Search ..................... 72/272, 60, 63, 56, 72/DIG. 31; 277/188 R, 188 A, 58

[56] References Cited

U.S. PATENT DOCUMENTS

| 3,126,096 | 3/1964 | Gerard | 72/DIG. 31 |
| 3,392,562 | 7/1968 | Fuchs, Jr. | 72/60 |
| 3,707,864 | 1/1973 | Pigott et al. | 72/272 |
| 3,914,981 | 10/1975 | Nilsson et al. | 72/60 |
| 3,934,442 | 1/1976 | Larker et al. | 72/DIG. 31 |

FOREIGN PATENT DOCUMENTS 1,170,931  11/1969  United Kingdom ................. 72/60

Primary Examiner—Leon Gilden
Attorney, Agent, or Firm—Watson, Cole, Grindle & Watson

[57] ABSTRACT

A press for hydrostatic extrusion includes a pressure chamber for enclosing a pressure medium which is formed of a high pressure cylinder, a pressure generating piston, a die and a die support and seals. The die support includes an exchangeable support ring which engages the end surface of the liner and bridges the gap between the liner and the die. A metallic sealing ring is arranged within the liner in engagement therewith, forming a gap between the inner surface of the sealing ring and the outer surface of the die or die support. The die support has a groove in its upper surface which contains a sealing member against which the edge of the metallic sealing ring engages. The lower outer corner of the metallic sealing ring is bevelled to form a space which communicates with the outside of the press.

3 Claims, 3 Drawing Figures

HIGH PRESSURE PRESS

BACKGROUND OF THE INVENTION

1. Field of the Invention

The invention relates to presses for hydrostatic extrusion with a die support and particularly to sealing such presses at the die end.

In presses for hydrostatic extrusion, very high pressure levels are used; usually the working pressure is between 10 and 20 kbar. At this high pressure a reliable seal must be achieved between the inner wall of a press cylinder and a die or a die support and between the inner wall of the cylinder and a punch or a piston projecting into the cylinder, said punch or piston, when it is inserted into the cylinder, producing the high extrusion pressure in a pressure medium which is enclosed in a pressure chamber formed of the cylinder, the die and the piston. A billet to be extruded is located in the pressure chamber and is pressed out through the die under the effect of a pressure medium. On raising the pressure from atmospheric level to the extrusion level, the inner diameter of the cylinder increases by 0.5 to 1%, which requires a seal which is to prevent pressure medium from flowing out through a gap between the cylindrical wall and the piston and the die, respectively, which expands upon a pressure increase. Any leakage at the high pressures mentioned may involve severe damage to the die or the die support, which requires an exchange of these expensive parts.

2. The Prior Art

In Pat. No. 3,702,555 there is shown and described in more detail a press of the kind referred to in this invention. In Larker application Ser. No. 462,402, filed Apr. 19, 1974, and U.S. Pat. Nos. 3,865,387 and 3,877,707 there are shown different variations of high pressure seals for presses for hydrostatic extrusion, having a first sealing ring abutting the cylindrical wall and a seal holder and a second sealing ring sealing against a die or piston and a seal holder. These seals have constituted a great improvement and have resulted in a great increase in the service life. However, certain drawbacks have remained. Particularly the sealing ring, whose inner surface seals against a die or a die support and whose end surface seals against a seal holder, has involved problems, especially in the case of hot extrusion. In hot extrusion the die and the die support are heated by the billet which is heated up to 600° C, and are expanded so that the contact force between these parts and the surrounding sealing ring increases. When the die and the die support are removed, cutting has occurred. Any scratches occurring have resulted in a failure of the seal in the subsequent pressing.

SUMMARY OF THE INVENTION

These problems are eliminated by the present invention.

According to the invention a press is provided with a die support with a surface which is pressed against the end surface of the liner of the high pressure cylinder and a support surface for the press die against which the die end surface seals, and one single cylindrical sealing ring, whose outer cylindrical surface seals against the inner surface of the liner and one end surface of which seals against the die support and which has such a thickness that a gap is formed between the inner cylindrical surface of the sealing ring and the outer surface of the die or the die support. The other characteristics of the invention are that the die support includes an exchangeable support ring which engages the end surface of the liner and bridges the gap between the liner and the die. A metallic sealing ring is arranged within the liner in engagement therewith, forming a gap between the inner surface of the sealing ring and the outer surface of the die or die support. The die support has a groove in its upper surface which contains a sealing member against which the edge of the metallic sealing ring engages. The lower outer corner of the metallic sealing ring is bevelled to form a space which communicates with the outside of the press.

BRIEF DESCRIPTION OF THE DRAWINGS

The invention is described in more detail with reference to the accompanying drawings.

DESCRIPTION OF THE PREFERRED EMBODIMENTS

Figure 1:
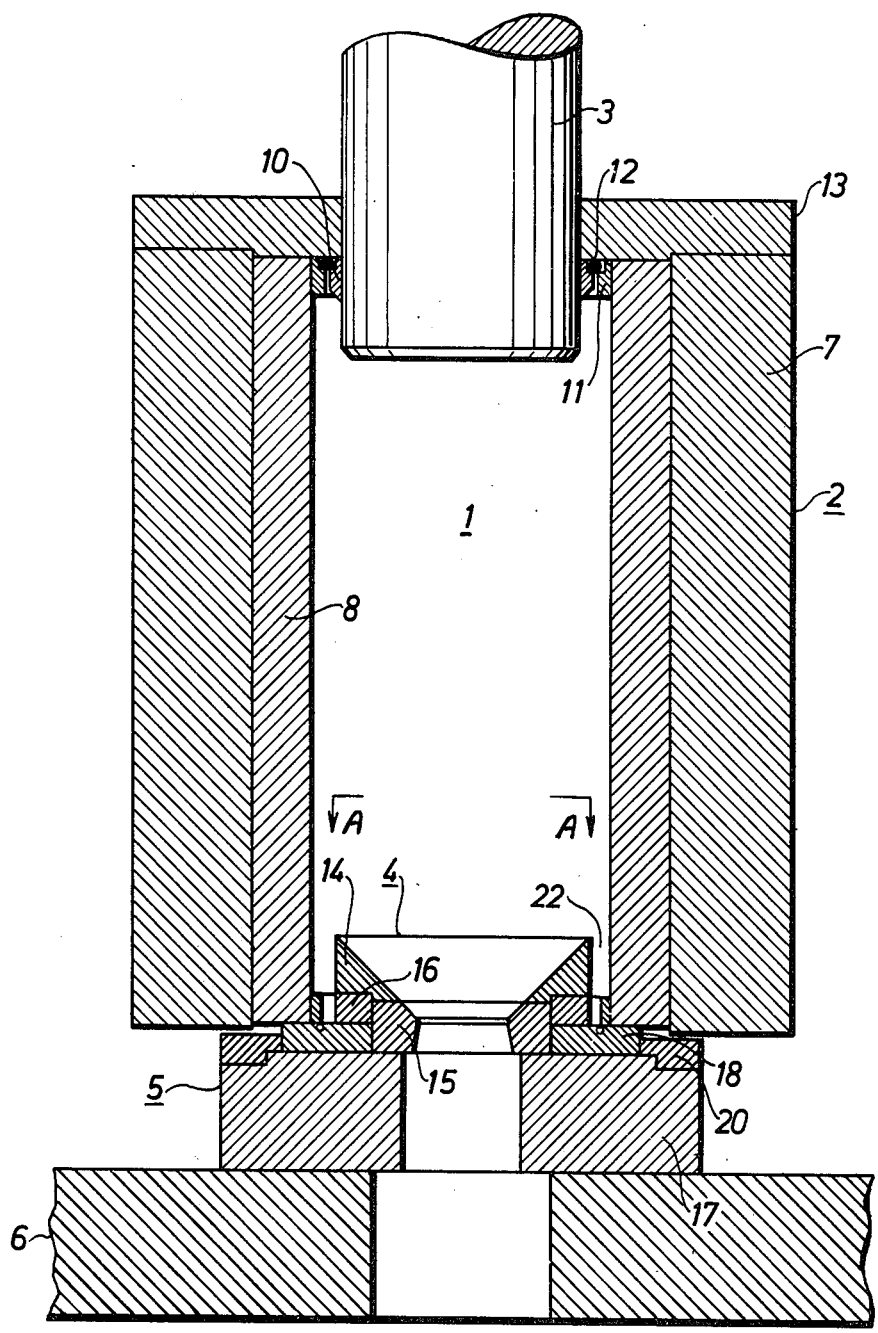
FIG. 1 shows schematically a pressure chamber in a hydrostatic extrusion press.
Figure 2:
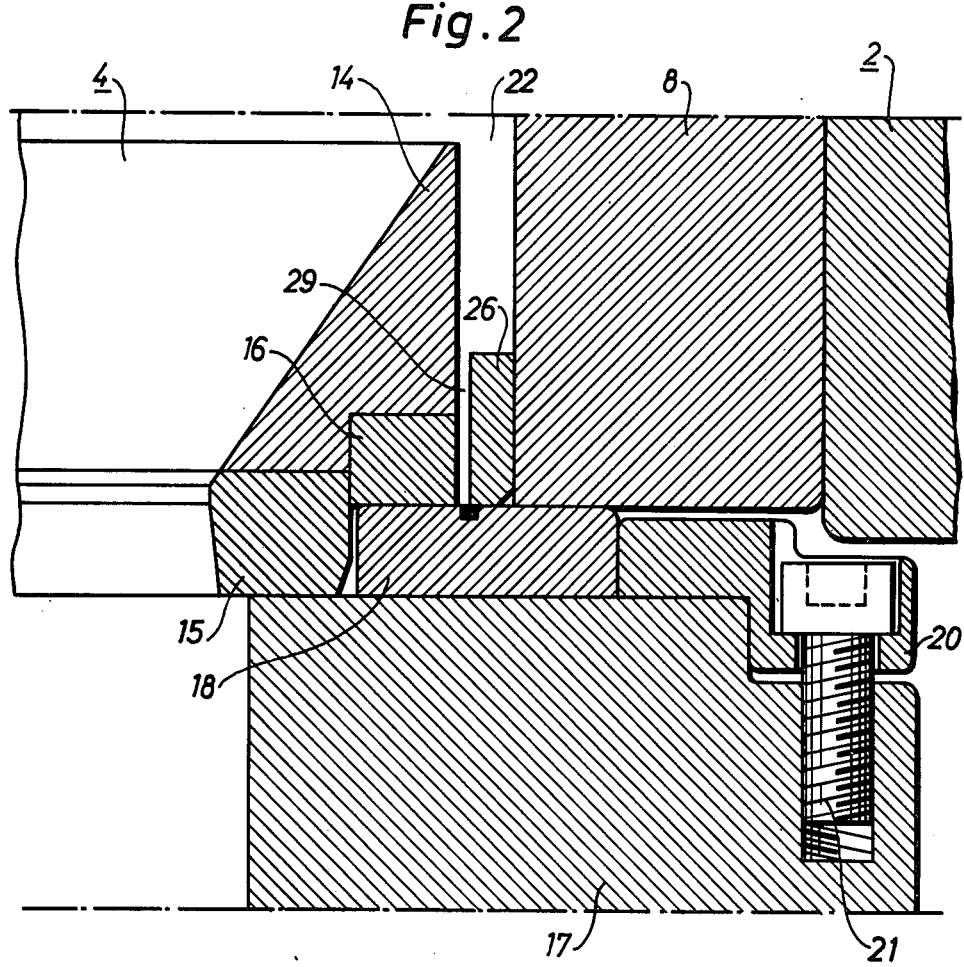
FIG. 2 shows on a larger scale the encircled portion in FIG. 1.
Figure 3:
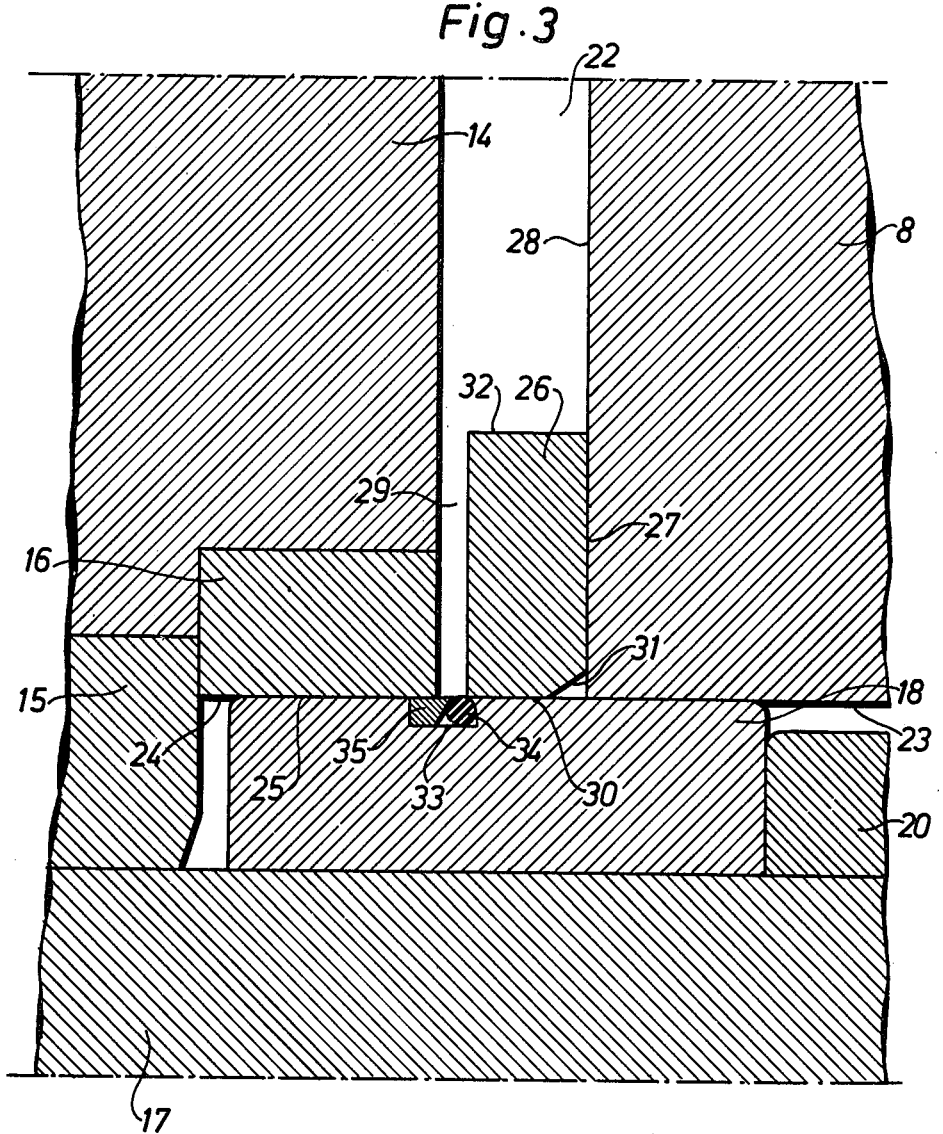
FIG. 3 shows on a still larger scale the die support and the seal at the die end of the pressure chamber.

In the figures, 1 designates a press chamber which is formed of a high pressure cylinder 2, a pressure generating piston 3, a die 4 and a die support 5 resting against a yoke 6 in a press, the rest of which is not shown. The high pressure cylinder comprises a cylinder 7, which may be built up in a manner known per se of a tube and prestressed wires or strips wound around said tube, and a liner 8 inserted in the cylinder 7. Between the plunger 3 and the liner 8 there is a seal consisting of two metal rings 10 and 11 and an O-ring 12. The end piece 13 of the cylinder 2 also forms a support for the seal. The die 4 consists of a performing part 14 and an end forming and calibrating part 15 and of a suitably prestressed ring 16 keeping said two parts together. The die support 5 comprises a strong annular part 17, an exchangeable support ring 18 and an attachment ring 20 arranged around said support ring 18 in a prestressed manner, said ring 20 being joined to the part 17 by a number of bolts 21.

The ring 18 of the die support bridges the gap 22 between the parts 14 and 16 of the die. The ring 18 is pressed against the end surface 23 of the liner 8. The end surface 24 of the die ring 16 seals against the upper surface 25 of the ring 18. In the gap 22 there is only one single metallic sealing ring 26, as opposed to previously used seals, the outer surface 27 of which abuts the inner surface 28 of the liner in a sealing manner since, in unloaded condition, the ring has a larger diameter than the liner and is prestressed when it is inserted. Between the sealing ring 26 and the die there is a gap 29 completely free of the sealing members used heretofore. The plane end surface 30 of the sealing ring 26 makes contact with the upper surface 25 of the support ring 18 of the die. At one corner the sealing ring is made with a bevel 31. The ring-shaped space formed by the bevel should be ventilated towards the atmosphere. The pressure acting on the end surface 32 above the bevel will be distributed along the plane end surface 30 of the ring, by which means the contact pressure between surfaces 30 and 25 will exceed the fluid pressure inside the high pressure chamber 1, thus obtaining good sealing. In the ring 18 there is an annular groove 33, in which there is a sealing ring 34 which provides initial sealing between the ring 18 and the ring 26. The sealing ring can be fixed in the groove by a locking ring 35 with an oblique outer side surface. The sealing ring may be a so-called O-ring, but another shape which also provides initial sealing between the die ring 16 and the support ring 18 may be used.

The advantage of the invention is that damage to the outer surface of the die will not jeopardize the sealing. Good sealing is relatively easy to obtain between the surfaces 24 of the die ring 16 and 25 on the support ring 18, since these can relatively easily be protected so that surface damage is prevented. It is possible to obtain a surface pressure which is greater than the fluid pressure in the pressure chamber, and this results in good sealing. An initial sealing can be easily obtained by an elastomeric sealing ring. The invention is particularly valuable in presses for hydrostatic hot extrusion, but constitutes a great improvement also in presses for extruding unheated billets.

I claim:

1. Press for hydrostatic extrusion having a press chamber intended to enclose a pressure medium, which press chamber is formed of a high pressure cylinder, a pressure generating piston, a die and/or a die support and seals, the die support having a surface which is pressed against the end surface of the liner of the high pressure cylinder and a support surface for the press die against which the die and surface seals, and one single cylindrical sealing ring of metal, the outer cylindrical surface of which seals against the inner surface of the liner and one end surface of which seals against the die support and which thickness is less than the difference between the external diameter of the die or die support and the internal diameter of the liner whereby the inner cylindrical surface of said sealing ring and the outer surface of the die or die support form an annular gap along the entire axial extension of the sealing ring.

2. Press according to claim 1, wherein the surface abutting the liner and the surface supporting the die lie in the same plane.

3. Press according to claim 1, wherein an exchangeable disc on the die support forms one of said support surfaces.

* * * * *